United States Patent
Ohashi

(10) Patent No.: US 7,311,127 B2
(45) Date of Patent: Dec. 25, 2007

(54) PNEUMATIC TIRE WITH TREAD HAVING SIPES

(75) Inventor: Toshiyuki Ohashi, Osaka (JP)

(73) Assignee: Toyo Tire & Rubber Co., Ltd., Osaka-Fu (JP)

( * ) Notice: Subject to any disclaimer, the term of this patent is extended or adjusted under 35 U.S.C. 154(b) by 170 days.

(21) Appl. No.: 11/111,723

(22) Filed: Apr. 22, 2005

(65) Prior Publication Data
US 2006/0016533 A1 Jan. 26, 2006

(30) Foreign Application Priority Data
Jul. 21, 2004 (JP) ............ P2004-213064

(51) Int. Cl.
*B60C 11/12* (2006.01)
(52) U.S. Cl. ............ 152/209.18; 152/209.21; 152/209.23; 152/DIG. 3; 152/902
(58) Field of Classification Search ........... 152/209.18, 152/209.21, 209.23, DIG. 3, 902
See application file for complete search history.

(56) References Cited

U.S. PATENT DOCUMENTS

| | | | | |
|---|---|---|---|---|
| 5,350,001 | A * | 9/1994 | Beckmann et al. | 152/209.18 |
| 6,427,737 | B1 * | 8/2002 | Katayama | 152/DIG. 3 |
| 2002/0053383 | A1* | 5/2002 | Kleinhoff et al. | 152/209.23 |
| 2006/0027295 | A1* | 2/2006 | Knispel et al. | 152/DIG. 3 |

FOREIGN PATENT DOCUMENTS

| | | |
|---|---|---|
| DE | 69505980 | 4/1997 |
| DE | 69923494 | 2/2006 |
| DE | 60116190 | 8/2006 |
| EP | 768959 | * 11/1998 |
| EP | 933235 | * 8/1999 |
| EP | 952011 | * 10/1999 |
| EP | 1170153 | * 1/2002 |
| JP | 02-246810 | * 10/1990 |
| JP | 02246810 | 10/1990 |
| JP | 06-143941 | * 5/1994 |
| JP | 06143941 | 5/1994 |
| JP | 9-094829 | * 4/1997 |
| JP | 2002-321509 | * 11/2002 |
| JP | 2002-356105 | * 12/2002 |

* cited by examiner

*Primary Examiner*—Steven D. Maki
(74) *Attorney, Agent, or Firm*—Hunton & Williams

(57) ABSTRACT

It is a subject to suitably decrease the rigidity of blocks, to generate suitable collapsing of the blocks, to sufficiently exhibit edge effects of sipes, and to improve braking performances and the like in the medium term of wear and thereafter; and for solving this subject, in a pneumatic tire formed with blocks on its tread and engraved with sipes 11 on the blocks, the sipes 11 are classified into a surface portion 12, an intermediate portion 13, and a bottom portion 14 in a depth direction from a tread surface 17 up to sipes bottom 18, wherein the surface portion 12 and the bottom portion 14 open in a wave-shaped form in which crest portions 21 and trough portions 22 of the wave-shaped form extend in directions vertical to the tread, while the intermediate portion 13 opens in a wave-shaped manner in which the crest portions 21 and trough portions 22 of the wave-shaped form extend in a zigzag-like manner.

4 Claims, 3 Drawing Sheets

[FIG.1]
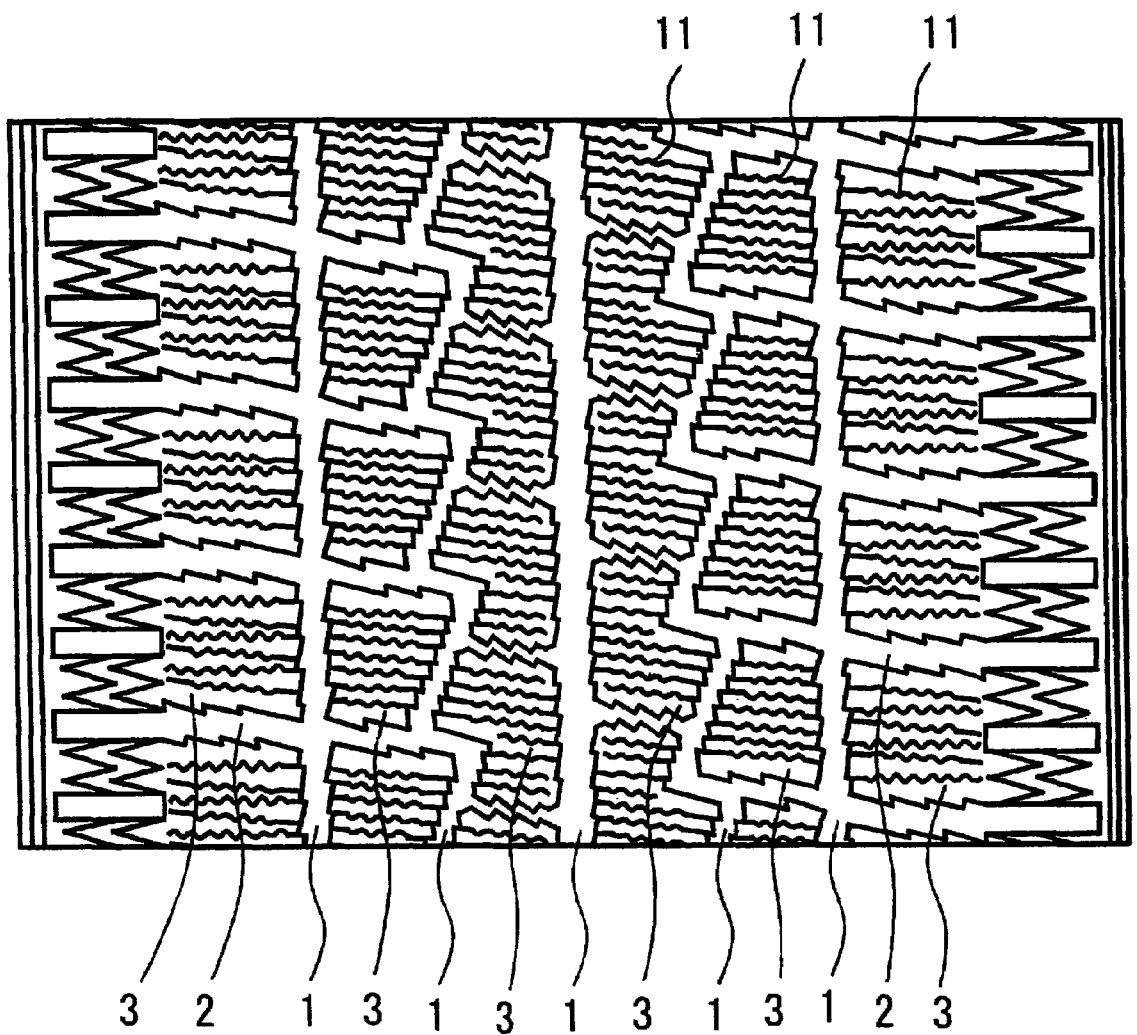

[FIG.2]
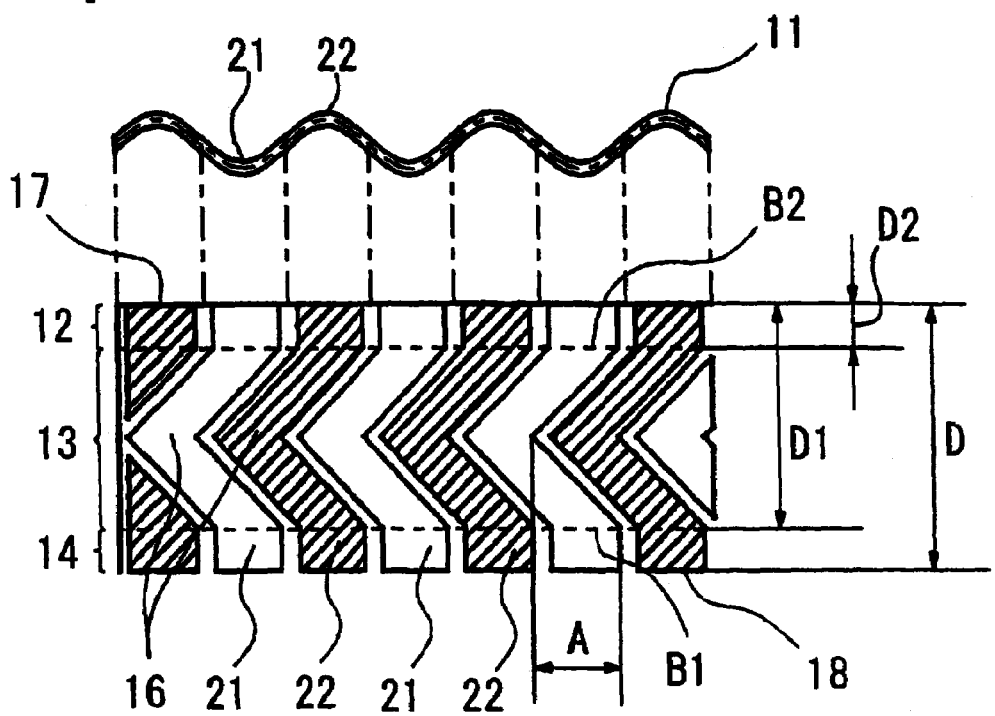
[FIG.3]
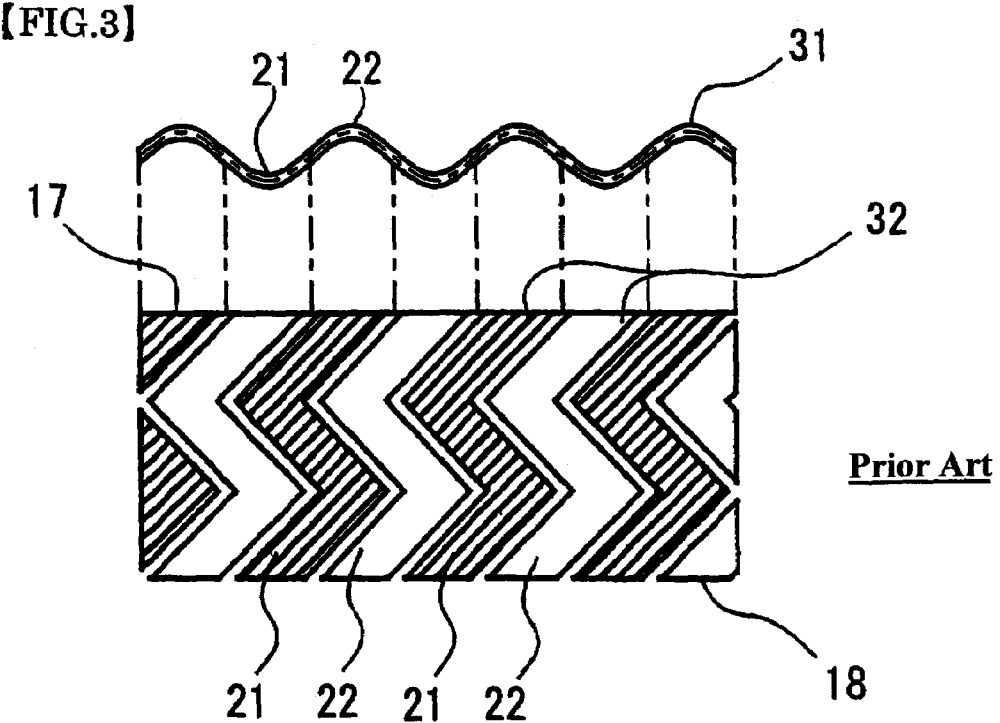
Prior Art

[FIG.4]
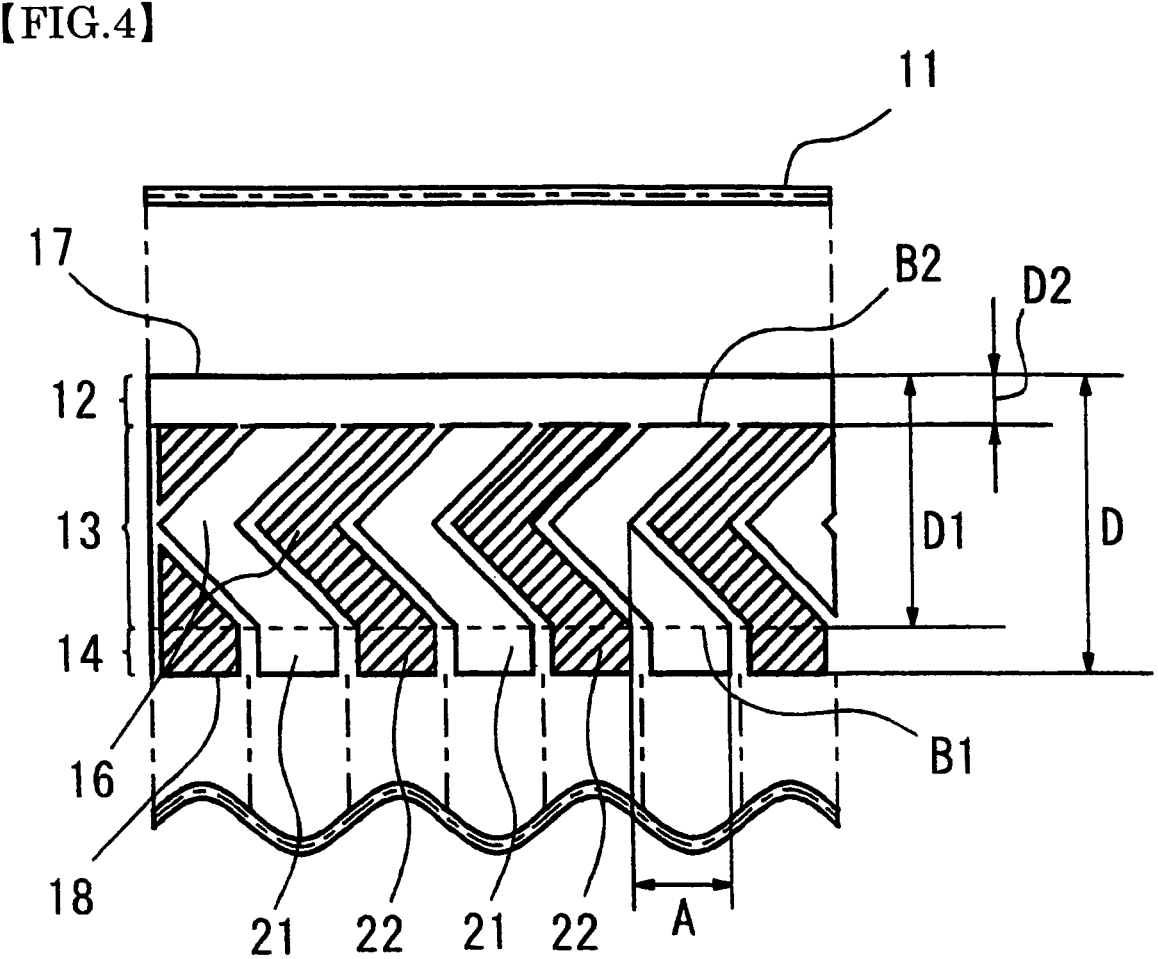

PNEUMATIC TIRE WITH TREAD HAVING SIPES

BACKGROUND OF THE INVENTION

1. Field of the Invention

The present invention relates to a pneumatic tire with sipes being formed on blocks, and particularly to a pneumatic tire in which grounding properties in a medium term of tire wear and thereafter has been secured for achieving improvements in tire performances.

2. Description of the Prior Art

While pneumatic tires are usually formed with circumferential grooves and transverse grooves on treads thereof, sipes of small width have been additionally engraved for improving drainage. Moreover, studless tires that aim for running on snowy and icy roads are formed with more sipes for exhibiting edge effects of the sipes and thus to improve braking, traction and cornering performances.

The rigidity of the blocks is generally degraded by forming such sipes. When increasing the number of sipes or the density thereof, the rigidity of the blocks may be excessively degraded. As a result, the blocks excessively collapse to decrease the ground contact area, thereby degrading the tire performance.

For preventing such excess degradations in the rigidity of the blocks, shapes of the sipes have been variously devised. As illustrated in FIG. 3, wave-shaped sipes 31 is formed on the blocks in a pneumatic tire as disclosed in Japanese Patent Application Laid-open No. 2002-321509. Crest portions 21 and trough portions 22 of the wave-shaped sipes 31 are arranged to extend not in a straight-linear manner but in a zigzag-like manner while extending from a tread surface 17 to a sipe bottom portion 18. As a result, while along the crest portions 21 and trough portions 22 blocks collapse in an aligned manner, the differences in aligning directions result in higher rigidity of the blocks. Consequently, excessive collapsing of the blocks is restricted so that edge effects of the sipes 31 are exhibited in a favorable manner.

However, according to the pneumatic tire of above mentioned invention, despite the fact that the height of the blocks in the medium term of wear and thereafter will decrease while the rigidity of the blocks is increased, the zigzags of the crest portions 21 and the trough portions 22 of the sipes 31 still extend up to the sipe bottom portion 18. As a result, no suitable collapsing of the blocks will occur due to extreme increases in rigidity of the blocks so that grounding properties will be worsened and edge effects will become insufficient.

Moreover, since the crest portions 21 and the trough portions 22 of the sipes extend obliquely from the tread surface 17 already in a new condition, acute angle portions 32 are formed at aperture portions of the sipes and uneven wear might progress therefrom.

It is accordingly an object of the present invention to suitably decrease the rigidity of the blocks, cause suitable collapsing of the blocks, to sufficiently exhibit edge effects of the sipes and to improve braking performances in the medium term of wear and thereafter.

For achieving the above subject, the inventors have arranged, upon intensive examinations, the present invention is a pneumatic tire with blocks being formed on a tread and with sipes being formed on the blocks, wherein the sipes are classified, in a depth direction from a tread surface up to a sipe bottom, into a surface portion, an intermediate portion and a bottom portion, wherein the surface portion and the bottom portion open in a wave-shaped form with crest portion and trough portions of the wave-shaped form extending in directions vertical to the tread, and wherein the intermediate portion opens in a wave-shaped form with crest portions and trough portions of the wave-shaped form extending in a zigzag-like manner.

The present invention is a pneumatic tire with blocks being formed on a tread and with sipes being formed on the blocks, wherein the sipes are classified, in a depth direction from a tread surface up to a sipe bottom, into a surface portion, an intermediate portion and a bottom portion, wherein the surface portion opens in a wave-shaped form with crest portions and trough portions of the wave-shaped form extending in directions vertical to the tread, wherein the intermediate portion opens in a wave-shaped form with crest portions and trough portions of the wave-shaped forms extending in a zigzag-like manner, and wherein the bottom portion opens in a straight-linear form.

The present invention is a pneumatic tire with blocks being formed on a tread and with sipes being formed on the blocks, wherein the sipes are classified, in a depth direction from a tread surface up to a bottom of the sipe, into a surface portion, an intermediate portion and a bottom portion, wherein the surface portion opens in a straight-linear form, wherein the intermediate portion opens in a wave-shaped form with crest portions and trough portions of the wave-shaped form extending in a zigzag-like manner, and wherein the bottom portion opens in a wave-shaped form with crest portions and trough portions of the wave-shaped form extending in directions vertical to the tread.

The present invention is a pneumatic tire with blocks being formed on a tread and with sipes being formed on the blocks, wherein the sipes are classified, in a depth direction from a tread surface up to a bottom of the sipe, into a surface portion, an intermediate portion and a bottom portion, wherein the surface portion and the bottom portion open in a straight-linear form, and wherein the intermediate portion opens in a wave-shaped form with crest portions and trough portions of the wave-shaped form extending in a zigzag-like manner.

When the blocks collapse, the crest portions and trough portions at an intermediate portion of the sipes will move into opposite directions since they extend in a zigzag-like manner. Due to the opposing directions of alignment, the rigidity of the blocks will be increased and excess collapsing of the blocks will be restricted. As a result, it is possible to secure a ground contact area for the blocks and to favorably exhibit edge effects of the sipes.

Accompanying the progress of wear of the tread, only the bottom portions of the sipes will remain so that the rigidity of the blocks becomes high while collapsing of the blocks will become insufficient. However, since the crest portions and the trough portions of the bottom portions extend in directions vertical to the tread, the rigidity of the blocks will be decreased so that excess collapsing will occur. As a result, it is possible to improve the grounding properties, to improve the edge effects, and to improve the tire performances such as braking performances. Similarly, when employing straight sipes which bottom portions open in a straight-linear form, the rigidity of the blocks will be decreased so that excess collapsing will occur to thus improve the edge effects.

Moreover, pullout resistance of sipe blade at the time of demolding from a mold will become small so that demolding becomes easy to thus prevent damages of the sipes.

By arranging the sipes as straight sipes that open in a straight-linear form or as wave-shaped sipes which crest portions and trough portions of the wave-shaped form extend in directions vertical to the tread are employed at the surface portions, no acute angle portions will be formed during the initial term of wear in which the rigidity of the blocks is low so that occurrence of uneven wear is restricted.

The present invention is the pneumatic tire further arranged in that where a depth of the sipes is D, a depth D1 from the tread surface to a boundary between the intermediate portion and the bottom portion is 40 to 90% of D, and a depth D2 from the tread surface to a boundary between the surface portion and the intermediate portion is 10 to 40% of D.

By setting D1 and D2 to be within specified ranges, it is possible to prevent uneven wear, to restrict excess collapsing of the blocks, and to exhibit sufficient edge effects during the initial term of wear. In the medium term of wear and thereafter, suitable collapsing of the blocks is made to occur to thus exhibit sufficient edge effects.

According to the present invention, by arranging the sipes as straight sipes which bottom portions open in a straight-linear form or as wave-shaped sipes which crest portions and trough portions of the wave-shaped forms extend in directions vertical to the tread, suitable collapsing of the blocks is made to occur to thus exhibit sufficient edge effects and to improve braking performances also in the medium term of wear and thereafter.

BRIEF DESCRIPTION OF THE DRAWINGS

FIG. 1 is a view illustrating a tread pattern of the pneumatic tire according to the present invention;

FIG. 2 is a sectional view illustrating a wall surface of sipes according to the present invention;

FIG. 3 is a sectional view illustrating a wall surface of sipes according to a prior art example; and FIG. 4 is a sectional view illustrating a wall surface of sipes according to the present invention.

DESCRIPTIONS OF THE PREFERRED EMBODIMENTS

Embodiment of the pneumatic tire according to the present invention will now be explained by use of the drawings.

FIG. 1 is a view illustrating a tread pattern of the pneumatic tire according to the present invention. In the drawings, blocks 3 are formed by main grooves 1 and transverse grooves 2, which are formed on a tread, and sipes 11 are engraved on the surface of the blocks 3. The sipes 11 include wave-shaped aperture portions on the tread surface.

FIG. 2 is a sectional view illustrating one wall surface of the sipes 11. The sipes 11 are classified into a surface portion 12, an intermediate portion 13, and a bottom portion 14 in a depth direction from the tread surface 17 to a sipe bottom 18. The depth of the sipes 11 are denoted as D, a depth from the tread surface 17 to a boundary B1 between the intermediate portion 13 and the bottom portion 14 as D1, and a depth from the tread surface 17 to a boundary B2 between the surface portion 12 and the intermediate portion 13 as D2.

At the surface portion 12, crest portions 21 and trough portions 22 of the wave-shaped form extend in directions vertical to the tread. At the intermediate portion 13, the crest portions 21 and trough portions 22 of the wave-shaped form extend in a zigzag-like manner. Again, at the bottom portion 14, the peaks portions 21 and trough portions 22 of the wave-shaped form extend in directions vertical to the tread.

In sipes 31 of the prior art example as illustrated in FIG. 3, the wave-shaped crest portions 21 and trough portions 22 extend in a zigzag-like manner already in a new condition so that acute angle portions 32 are formed on the tread surface 17. Accordingly, the rigidity of the blocks 3 is low at the initial term of wear so that uneven wear might be caused. However, in case of the sipes 11 according to the present invention, no acute angle portions are formed at the surface portion 12 so that there is no fear that uneven wear is caused.

When the blocks 3 collapse, the crest portions 21 and trough portions 22 of the sipes 11 move in an aligned manner. At the intermediate portion 13, the crest portions 21 and trough portions 22 extend in a zigzag-like manner so that they move in opposite directions so that collapsing of the blocks 3 is restricted. Particularly in the case where bent portions 16 are provided, it is possible to further restrict collapsing. As a result, the ground contact area of the blocks 3 can be secured so that edge effects of the sipes 11 can be favorably exhibited.

With the progressing of wear of the tread, only the bottom portion 14 of the sipes 11 will remain. Since the height of the blocks 3 is already low, the rigidity of the blocks 3 will be high and collapsing of the blocks 3 might become insufficient. However, since the crest portions 21 and the trough portions 22 of the bottom portion 14 extend in directions vertical to the tread, the rigidity of the blocks 3 is decreases so that suitable collapsing is caused. As a result, it is possible to improve the grounding properties, to improve the edge effects, and to improve tire performances such as braking performances.

FIG. 4 is a sectional view illustrating one wall surface of the sipes 11 according to another embodiment, which illustrates an example suitable for use in so-called summer tires focusing attention on the drain properties of the sipes. While it differs in the point that the surface portion 12 of the sipes 11 is arranged in a straight-linear form instead of in a wave-shaped form, but the arrangement of the intermediate portion 13 and the bottom portion 14 are identical to those of the sipes as illustrated in FIG. 2. The actions and effects of the intermediate portion 13 and the bottom portion 14 are as stated above.

In the sipes as illustrated in FIGS. 2 and 4, the sipes of the bottom portion 14 are arranged in a straight-linear form instead of in a wave-shaped form such that the rigidity of the blocks 3 is further decreased in the medium term of wear and thereafter to cause collapsing of the blocks 3 for further improving edge effects.

In this respect, D1 is preferably set to be 40 to 90% of the sipe depth D, and D2 to be 10 to 40% of the sipe depth D. When D1 exceeds 90%, the bottom portion 14 will become short so that edge effects in the medium term of wear and thereafter cannot be achieved. Where D1 is less than 40% or where D2 exceeds 40%, the intermediate portion 13 becomes short so that the rigidity of the blocks 3 in the initial term of wear will be decreased so that no satisfactory edge effects can be obtained. Where D2 is less than 10%, the surface portion 12 will become short so that it might happen that uneven wear is progressed in the initial term of wear. Amplitude A of the zigzag of the intermediate portion 13 is preferably 1.5 to 3 mm. Where it is less than 1.5 mm, effects of improving the rigidity of the intermediate portion 13 will be small while where it exceeds 3 mm, the sipes 11 might be damaged at the time of demolding from the mold.

The wave-shaped forms of the sipes include, besides the illustrated curved wave-shaped forms, zigzag-like forms.

The sipes may be anyone of closed sipes in which both end portions are blocked inside of the blocks, one-side open sipes which one-end portions are open, or open sipes which both end portions are open. They may also be sipes in which straight-linear portions continue from both end portions or one end portion of the wave-shaped form.

EXAMPLES

The pneumatic tire according to the present invention and the pneumatic tire according to the prior art have been manufactured on trial as examples for performing performance evaluations. Both tires were provided with tread patterns as illustrated in FIG. 1, and the present example includes sipes as illustrated in FIG. 2 and the prior art those of FIG. 3, respectively. The sipe depth D was 7 mm in both cases, where D1 was set to 5.5 mm, D2 to 1.5 mm, and A to 2 mm in the present example. The tire size was 195/65R15, and performance evaluations were performed upon mounting the tires to a front wheel drive sedan type passenger car of 2000 cc.

In Table 1, "ice braking" denotes reciprocals of ABS braking distances obtained when running on an icy surface road at a velocity of 40 km/h. Values were indicated as indices with that of the new prior art tire being 100, and the larger the values were, the better the performances were. In this respect, a "worn condition" indicates a case in which the tread has worn up to 60% of the sipe depth D.

TABLE 1

|  | Example | Prior Art Example |
|---|---|---|
| Ice braking (new condition) | 106 | 100 |
| Ice braking (worn condition) | 104 | 98 |

According to the Table 1, the tire of the present example includes bottom portions that extend vertically with respect to the tread instead of employing zigzag-like crest portions and trough portions of the wave-shaped forms so that suitable collapsing of the blocks is caused in the medium term of wear and thereafter, and braking performances are increased.

What is claimed is:

1. A pneumatic tire with blocks being formed on a tread and with sipes being formed on the blocks,
   wherein the sipes are classified, in a depth direction from a tread surface up to a sipe bottom, into a surface portion, an intermediate portion and a bottom portion, wherein the surface portion opens in wave-shaped form with crest portions and trough portions of the wave-shaped forms extending in directions vertical to the tread, wherein the intermediate portion opens in wave-shaped form with crest portions and trough portions of the wave-shaped forms extending in a zigzag-like manner, and wherein the bottom portion opens in a straight-linear manner.

2. The pneumatic tire as claimed in claim 1, wherein where a depth of the sipes is D, a depth D1 from the tread surface to a boundary between the intermediate portion and the bottom portion is 40 to 90% of D, and a depth D2 from the tread surface to a boundary between the surface portion and the intermediate portion is 10 to 40% of D.

3. A pneumatic tire with blocks being formed on a tread and with sipes being formed on the blocks,
   wherein the sipes are classified, in a depth direction from a tread surface up to a bottom of the sipes, into a surface portion, an intermediate portion and a bottom portion, wherein the surface portion opens in a straight-linear form and extends in a depth direction in a straight-linear form, wherein the intermediate portion opens in a wave-shaped form with crest portions and trough portions of the wave-shaped form extending in a zigzag-like manner, and wherein the bottom portion opens in a wave-shaped form with crest portions and trough portions of the wave-shaped forms extending in directions vertical to the tread.

4. The pneumatic tire as claimed in claim 3, wherein where a depth of the sipes is D, a depth D1 from the tread surface to a boundary between the intermediate portion and the bottom portion is 40 to 90% of D, and a depth D2 from the tread surface to a boundary between the surface portion and the intermediate portion is 10 to 40% of D.

* * * * *